United States Patent [19]

Lifshits

[11] Patent Number: 5,102,329

[45] Date of Patent: Apr. 7, 1992

[54] HIGH INTENSITY BURNER

[75] Inventor: Vladimir Lifshits, Palo Alto, Calif.

[73] Assignee: Coen Company, Inc., Burlingame, Calif.

[21] Appl. No.: 685,321

[22] Filed: Apr. 15, 1991

[51] Int. Cl.$^5$ .............................................. F23D 14/62
[52] U.S. Cl. ..................................... 431/354; 431/178; 431/328; 159/4.02; 239/568
[58] Field of Search .................. 431/8, 178, 328, 285, 431/354; 159/4.02; 239/568

[56] References Cited

U.S. PATENT DOCUMENTS

| | | |
|---|---|---|
| 1,474,705 | 11/1923 | Bluemel . |
| 2,547,276 | 4/1951 | Marsh . |
| 2,973,808 | 3/1961 | Fox . |
| 3,219,096 | 11/1965 | Goeke et al. . |
| 3,615,249 | 10/1971 | Martois . |
| 4,690,639 | 7/1987 | Voorheis . |
| 4,782,768 | 11/1988 | Lee et al. . |
| 4,887,963 | 12/1989 | LeMer ................................. 431/328 |

FOREIGN PATENT DOCUMENTS

| | | | |
|---|---|---|---|
| 473519 | 9/1914 | France ................................. 239/568 |
| 737745 | 6/1980 | U.S.S.R. . |

Primary Examiner—Carroll B. Dority

Attorney, Agent, or Firm—Townsend and Townsend

[57] ABSTRACT

A burner suitable for use in conjunction with an air heater. The burner has a burner plate including a plurality of slots. The burner plate slots are aligned with and spaced from fuel supply tubes. The tubes have spaced apart orifices that discharge fuel gas in conical patterns and direct the gas jets through the slots in the burner plate and into the combustion chamber downstream from the burner. A baffle plate is positioned above the fuel supply tubes and extends across an air supply plenum. The baffle plate includes air discharge orifices through which the air from the plenum enters the burner in substantially uniform flow. The baffle plate orifices direct the air toward the burner plate for cooling. The air heated by the burner plate eventually flows toward and through the burner plate slots where it forms a layer between the fuel gas jets and the perimetrical surfaces and edges of the burner plate slots and, thus, maintains the fuel gas spaced from these surfaces and edges. The gas velocity exceeds the air velocity to the extent that the gas and air flows are effectively kept separate before entering the combustion chamber. With this construction, very high fuel flow velocities can be used to generate very high turbulence, and a high intensity flame with reduced $NO_x$ emissions without flame flashback into the burner, within wide turndown.

23 Claims, 5 Drawing Sheets

HIGH INTENSITY BURNER

BACKGROUND OF THE INVENTION

The present invention relates to burners generally, and more particularly to a high intensity burner construction suitable for use in conjunction with variously configured air heaters.

A typical large industrial slurry dryer is shown in FIG. 1 in conjunction with a ring-shaped air heater and burner combination. The dryer assembly 1 includes a funnel shaped housing 2 from which slurry pump and atomizer 3 discharge the slurry from the small diameter end of rotating nozzle 4 into a drying space 5 where the slurry is dried and the dried particles 6 are gravitationally separated from the water 7 and are dropped into a hopper (not shown) for removal. Fins 8 are angularly oriented such that when rotated fins 8 draw hot 700°–1000° C. gas-air from plenum 9, through annular opening 10, and along the conical outside of housing 2 through conical ring duct 11. The hot gas-air then exits duct 11 as it is directed toward the slurry discharge opening of nozzle 4 where it is mixed with the atomized slurry to drive off the water.

Among the drawbacks of conventional burners are $NO_x$ emissions, complex constructions to prevent flame propagation into the burner, and low turn down rates. Although attempts have been made to reduce $NO_x$ emissions and prevent flame propagation into the burner, while maintaining the desired turn down rate, no single system having a simple construction has achieved all three of these results.

SUMMARY OF THE INVENTION

The present invention is directed to a burner for heating air prior to exhaust from a duct adapted to direct the heated air toward the discharge of an industrial dryer. The invention avoids the problems and disadvantages of the prior art by providing a burner construction that generates a high intensity flame. The burner comprises a lower plate having a plurality of relatively narrow slots through the thickness thereof for introducing a combustion mixture into a combustion chamber. The burner also includes a plurality of tubular members positioned above the lower plate. Each tubular member has a portion for coupling the member to a fuel gas source. Each member also has a plurality of openings that are aligned with one of the slots for directing fuel gas toward and through the slot in the lower plate. An upper plate is positioned above the tubular members. The upper plate includes a plurality of holes or nozzles through the thickness thereof for introducing combustion air into the space formed between the upper and lower plates. The holes in the upper plate are oriented such that the air introduced through the holes is directed toward the imperforate portion of the lower plate and, thus, along a path spaced from the fuel jet. As combustion air continues to be forced into the burner, the pressure developed in the burner causes combustion air, which has reached the lower plate of the burner, to change course (by about 90 degrees) and flow toward the lower plate slots where it exits into a lower pressure region.

Since the inlet plate holes are offset relative to the burner plate slots and the gas jets are focused so they do not impinge on the upper surface of the burner plate, the gas and air streams essentially remain separate until both are discharged into the combustion chamber. As a result, mixing of fuel gas and combustion air to the extent necessary for combustion in the burner is precluded. Although some mixing of fuel gas and combustion air (controlled exclusively by fuel jet entrainment) occurs along the boundary line between each cone-shaped gas jet and the air, this mixing is negligible. The flow pattern in this area has a velocity component in the downstream direction that many times exceeds the propagation velocity of the flame in any possible emergency situation (like air flow failure). Accordingly, any flame flashback from the combustion chamber is precluded. In the case of spontaneous ignition inside the cone (for any reason) the flame will be immediately blown out downstream of the burner plate.

While theoretically it is possible for the flame to exist upstream of the burner plate, under extremely low loads that are out of practical interest, that flame will be surrounded by air without touching any burner element inside, and will not produce any danger.

With the above burner construction, very high gas flow velocities can be used which in turn generate very high turbulence in the combustion chamber. As a result, the flame in the combustion chamber is a high intensity flame, meaning that combustion takes place in a relatively small volume. At the same time, a turn down ratio of more than 20:1 is achievable.

Since the total cross-sectional area of the holes in the inlet plate is significantly less than the transverse cross-sectional area of the combustion air plenum immediately adjacent to the inlet plate, a damming effect results on the upstream side of the inlet plate. A pressure equalization on that side of the inlet plate results which provides a substantially uniform and equal air flow through each inlet hole of the inlet plate. A similar damming effect is produced by the burner plate. The result is a uniform distribution of air over the burner plate and through its slots. The uniform combustion air distribution provides a substantially uniform air-to-fuel ratio throughout the combustion chamber which further increases the intensity of the flame.

Stable ignition of the fuel is sustained by recirculation of hot combustion products in the areas between slots downstream of the burner plate.

Another advantage of this construction is that with a sufficient amount of excess air (air in excess of that needed for complete combustion) the burner generates very low $NO_x$. This results from the low residence time of the nitrogen (from the combustion air) in the high intensity flame and the avoidance of hot spots within the flame due to the turbulence and uniform air-to-fuel ratio throughout the combustion chamber volume.

Generally speaking, this burner has advantages of premixed type burners without having their typical disadvantages such as safety-related problems and low turn down ratios (for the present invention, for example, experimental data show turn down ratios of more than 20:1).

The provision of finger fins on the burner plate facilitates cooling of the burner plate and helps keep it at relatively low temperatures, while promoting preheating of the combustion air before it reaches the combustion chamber.

The above is a brief description of some deficiencies in the prior art and advantages of the present invention. Other features, advantages and embodiments of the invention will be apparent to those skilled in the art

DESCRIPTION OF THE PREFERRED EMBODIMENT

Figure 2:
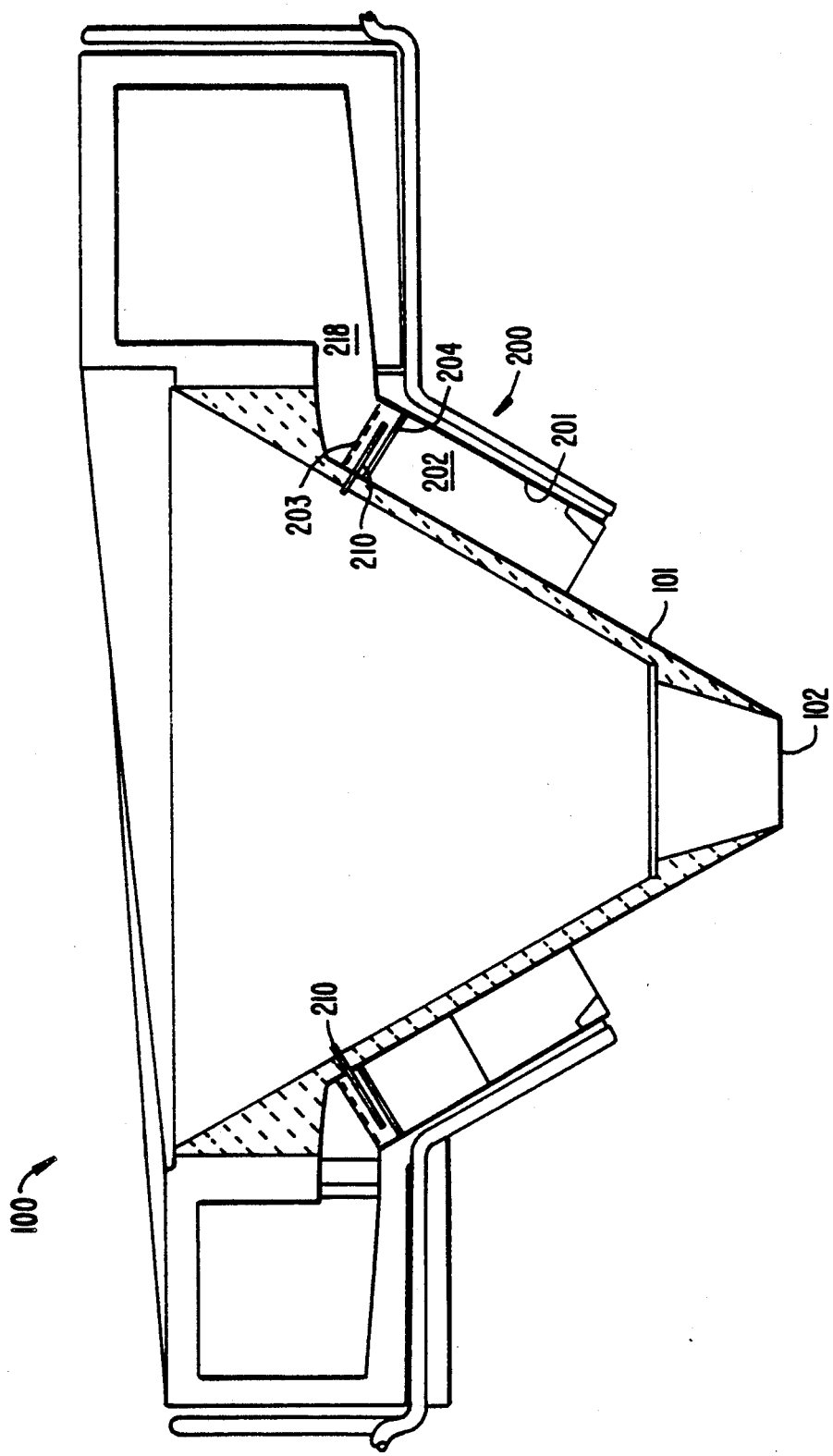
FIG. 2 is a diagrammatic illustration of a funnel-shaped industrial dryer having a burner and heating duct in accordance with the principles of the present invention.

Referring to the drawings in detail, wherein like numerals indicate like elements, the high intensity burner and dryer assembly is illustrated in accordance with the principles of the present invention. As shown in FIG. 2, high intensity burner assembly 200 surrounds funnel-shaped housing 101 of dryer assembly 100. Insulation 103 is provided between funnel-shaped housing 101 and conical ring duct 201 of burner assembly 200 to impede heat transfer into the slurry within housing 101.

Figure 3:
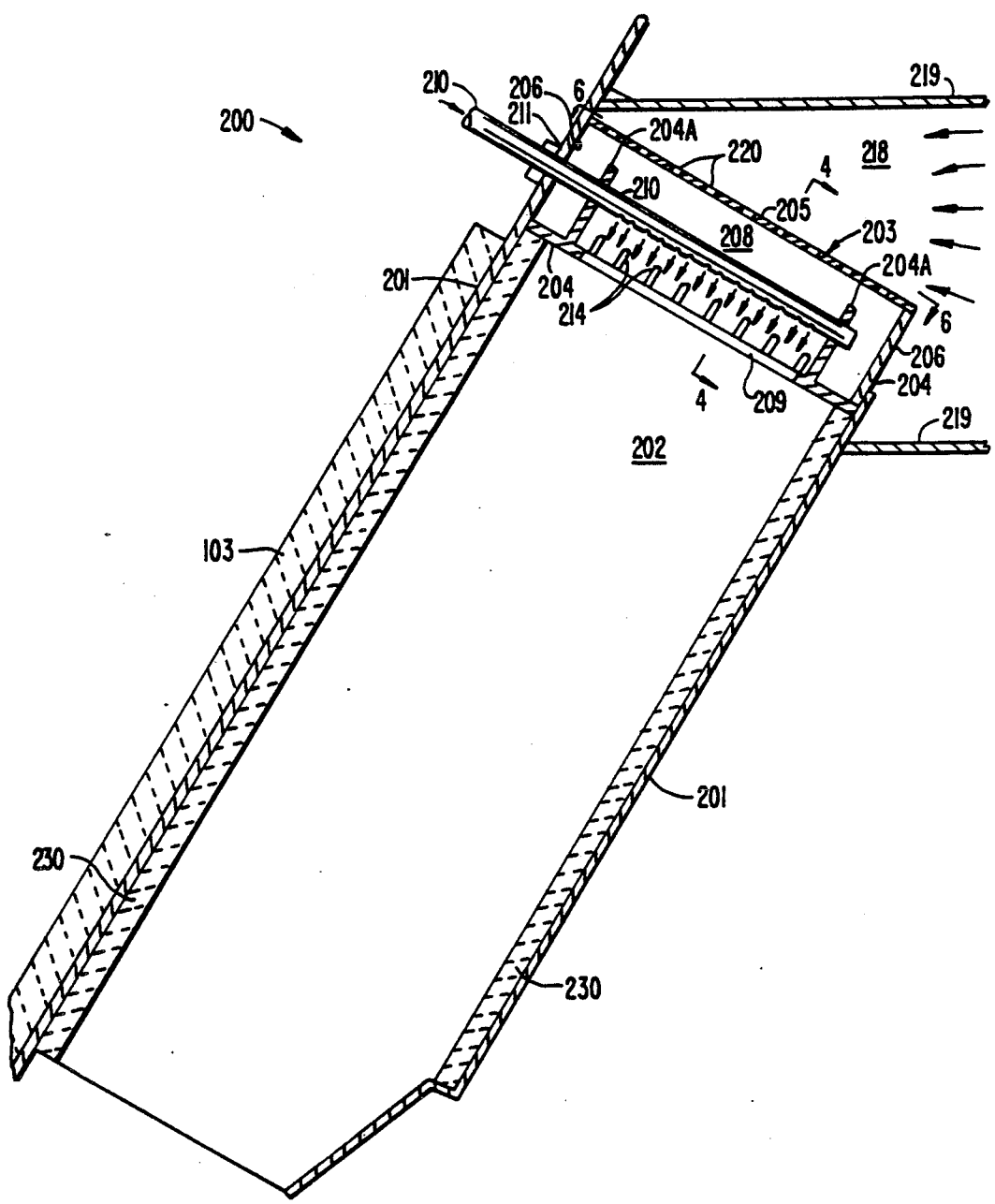
FIG. 3 is a sectional view of the burner and heating duct of FIG. 2.
Figure 5:
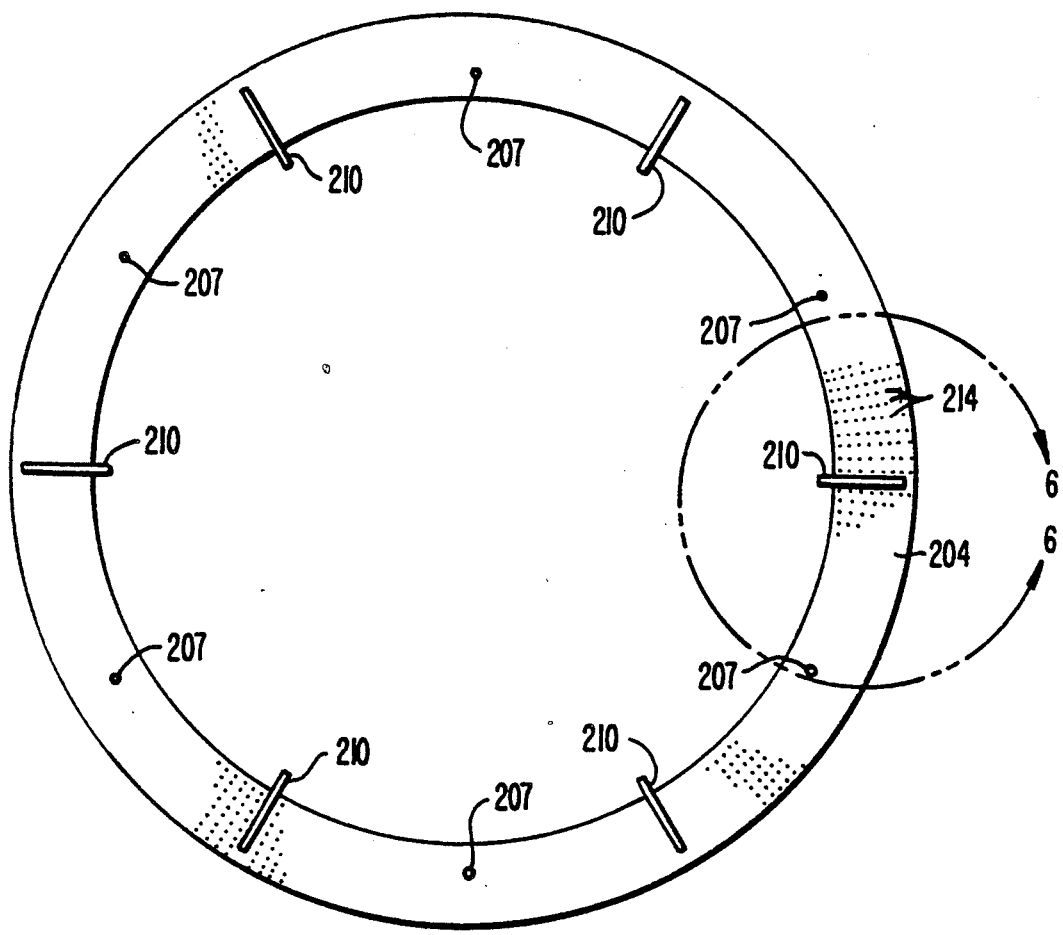
FIG. 5 is a top plan view of the burner plate and fuel gas tubes of FIG. 3.
Figure 6:
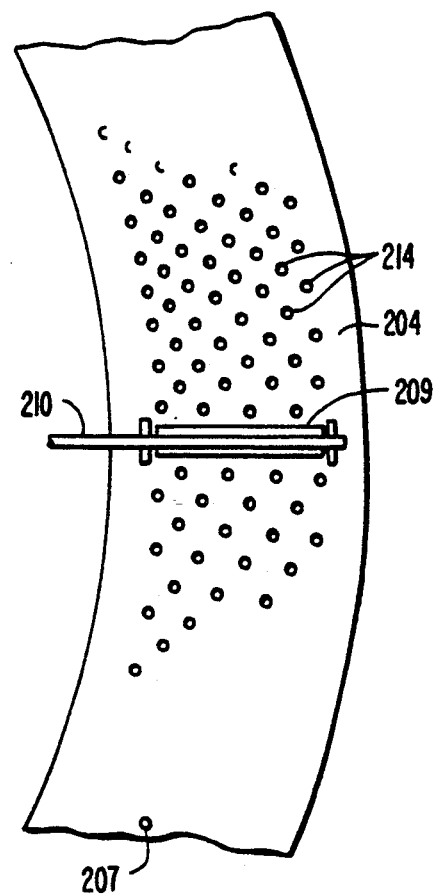
FIG. 6 is an enlarged sectional view of FIG. 5.

Referring to FIG. 3, burner assembly 200 includes burner 203 positioned at the upper end of conical ring duct 201. Conical duct 201 defines combustion chamber 202. Burner 203 includes a lower annular burner plate 204, preferably comprising heat-resistant steel or alloy casting, and upper annular inlet or baffle plate 205 which together with side walls 206 form burner chamber 208. Burner plate 204 is generally parallel to baffle plate 205. Although one side wall 206 is shown as being part of duct 201 and the other as comprising a discrete member coupled to duct 201, it should be understood that other constructions can be used to form burner chamber 208 without departing from the scope of the invention. However, the burner preferably includes a number of modules installed side by side around the perimetrical surface of the funnel-shaped housing to form the ring-shaped burner plate, inlet or baffle plate and side wall configuration. Depending on its size, each burner module (or each other module) is equipped with a conventional flame ignitor or pilot that is positioned to deliver a spark adjacent to the downstream side of burner plate 204 (described below). Such an ignitor is diagrammatically illustrated in FIGS. 5 and 6 and designated with reference numeral 207. Although ignitor 207 is shown a extending through burner plate 204 to deliver the spark as described above, other arrangements for positioning the ignitor can be used without departing from the scope of the invention. For example, each ignitor can be placed through a respective slot. However, the ignitors should be flush with the downstream side of plate 24 to avoid its overheating.

Figure 1:
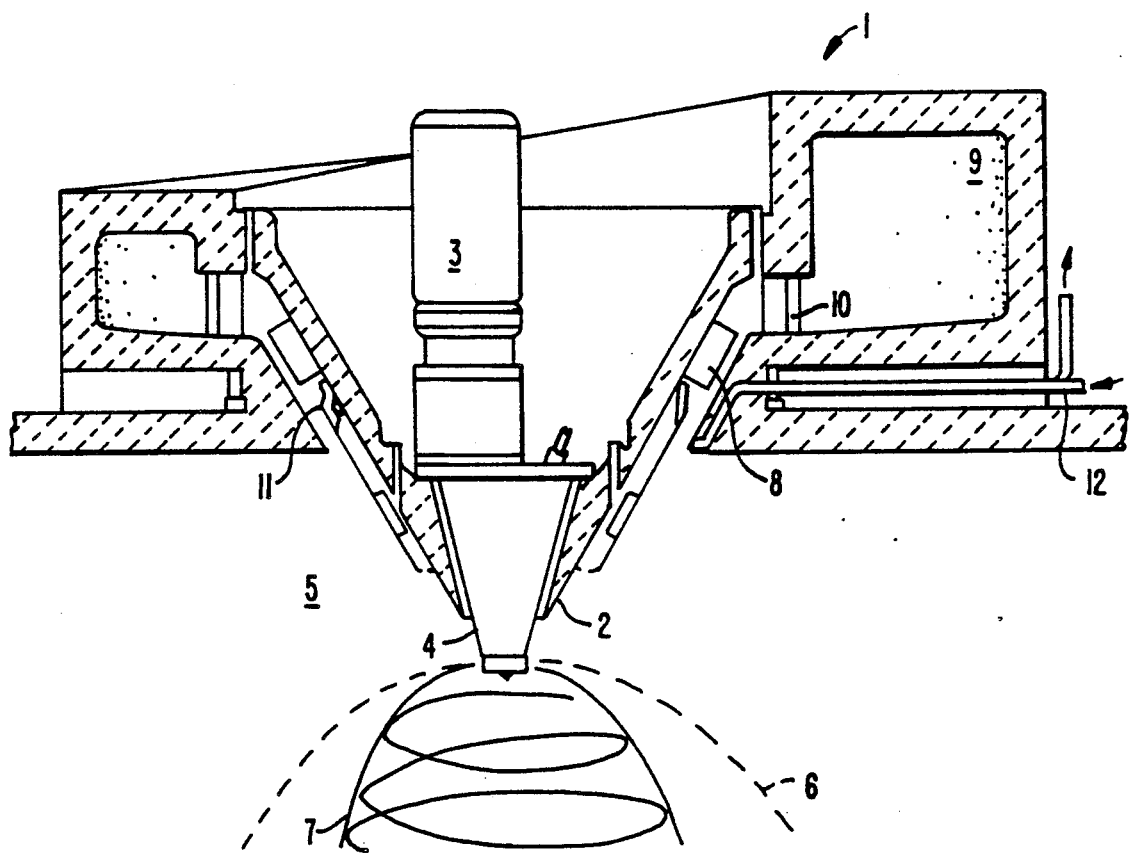
FIG. 1 is a diagrammatic illustration of a typical funnel-shaped industrial dryer.
Figure 4:
FIG. 4 is a sectional view of the burner taken along line 4—4 in FIG. 3.
Figure 4:
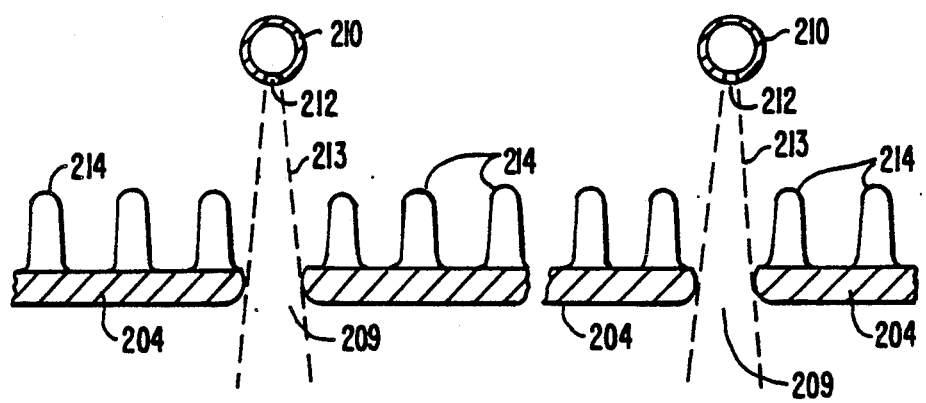

Ring-shaped burner plate 204 is disposed in conical duct 201, faces combustion chamber 202 and includes slots 209 that are radially oriented relative to the center line (CL) of funnel-shaped housing 101. Fuel supply tubes 210, which introduce natural gas, for example, into burner chamber 208, also extend radially relative to the center line of funnel-shaped housing 101. Tubes 210 extend above burner plate 204 such that tubes 210 are aligned with (generally parallel to) and spaced from burner plate slots 209 (FIG. 4). Burner plate 204 includes vertical supports 204A that extend upstream and maintain fuel supply tubes 210 spaced from burner plate 204. Other burner plate slot and fuel gas tube configurations can be used as long as each set of fuel gas tube orifices is aligned with and spaced from a respective slot. For example, the burner plate slots and fuel supply tubes can be annular and arranged such that they form concentric rings around the burner plate center, wherein each annular fuel gas tube has its orifices aligned with and spaced from a cooperating annular slot.

It is important that the fuel gas jets do not impinge against burner plate 204. Otherwise fuel gas would be deflected back into burner chamber 208 and mix with combustion air. Then combustion could take place before the mixture reaches combustion chamber 202 such combustion can overheat the burner plate edges. The fuel concentration near the burner plate edges also can cause such combustion, if that concentration exceeds a certain level. Although the fuel supply tubes could be placed very close to the burner plate to avoid fuel gas deflection, such an arrangement would delay mixing and ignition. This delay would require the provision of more space between slots to ensure the requisite recirculation of hot combustion products. That increased space would significantly reduce the maximum achievable flame intensity. It has been found that when the ratio between the vertical distance from the burner plate slot and its respective fuel supply tube orifices and the width of the burner plate slot is about 1.5:1 to 4:1, and preferably 3:1; the fuel supply tube orifices can be spaced with distances between orifices close to the slot width.

The distance between radially oriented slots 209 also can influence flame intensity. When slots 209 are too close to one another, the size of the recirculation zones between slots in the downstream direction and the residence time of the fuel gas-air mixtures when passing between recirculation zones are reduced to the extent that flame blowout results, while the load is below the desirable level. In other words, the period in which the fuel gas-air mixture remains exposed to the entraining of gases from the recirculation zones is insufficient to produce combustion and thus supply the recirculation zones with hot combustion products that sustain ignition. On the other hand, when adjacent slots are spaced too far apart, flame intensity significantly decreases with the decreasing amount of fuel and air per unit of burner cross section, and flow downstream of the burner becomes very nonuniformed. It has been found that adjacent burner plate slots should be spaced about 5 to 8 inches apart to provide the desired combustion characteristics.

Returning to FIG. 3, each tube 210 extends through a hole 211 in the side wall 206 adjacent to funnel-shaped housing 101. Alternatively, tubes 210 can extend through the side wall 206 distal to funnel-shaped housing 101. Tubes 210 are sealed in holes 211, as is conventionally known to those skilled in the art, to prevent leakage into or from burner chamber 208. Gas tubes 210 include spaced apart openings or orifices 212 which discharge the gas in conical patterns, as designated by dashed lines 213, and direct the gas through slots 209 and into combustion chamber 202.

Burner plate 204 also includes a multitude of projections or fins 214 to promote heat transfer from burner plate 204 and thus cool burner plate 204 (FIGS. 3-6). Otherwise, the heat generated by the flame in combustion chamber 202 could damage the burner plate which does not have refractory protection.

Air inlet or baffle plate 205 extends above gas supply tubes 210 and into an air plenum 218 which is defined by walls 219 that are sealingly coupled to duct 201. Baffle plate 205 includes a multitude of air discharge holes or orifices 220 through which the air from plenum 218 enter burner chamber 208. Orifices 220 direct the incoming air against the surface of burner plate 204 thereby providing intensive cooling of burner plate 204. In addition, the total cross-sectional area of slots 209 is significantly less than the baffle plate orifices 220. This construction further promotes the uniform distribution of air through slots 209 and, thus, in combustion chamber 202. The total cross-sectional area of the baffle plate orifices 220 is significantly less than the cross-sectional area of the plenum immediately adjacent to the baffle plate. Accordingly, a damming effect results on the upstream side of the baffle plate. This creates a pressure equalization on the upstream side of the baffle plate which in turn generates a substantially uniform and equal air flow through each baffle plate orifice 220, thereby providing a uniform distribution of combustion air in the burner chamber and uniform burner plate cooling. In addition, the total cross-sectional area of slots 209 is significantly less than the total cross-sectional area of the baffle plate orifices 220. This construction further promotes the uniform distribution of air through slots 209 and, thus, in combustion chamber 202.

Figure 7:
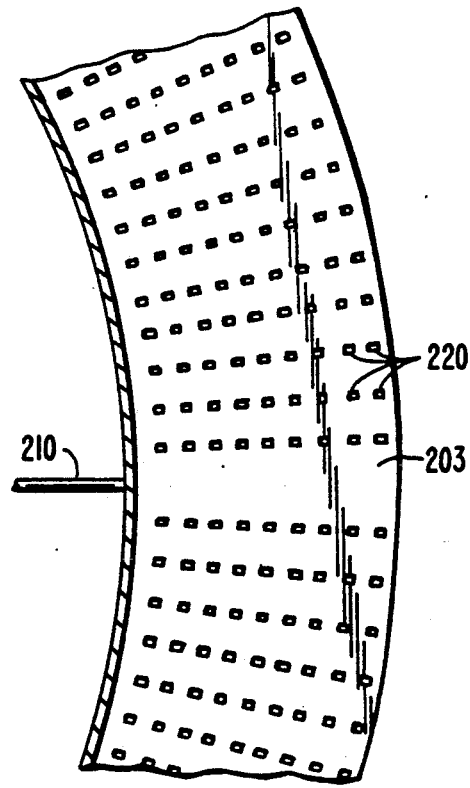
FIG. 7 is a top plan section of the burner inlet plate of FIG. 3.

Referring to FIGS. 4 and 7, imperforate baffle portions 221, formed in plate 205, are positioned above fuel supply tubes 210. Although orifices 220 are offset relative to slots 209 and tubes 210 to minimize interference between air entering burner chamber 208 through orifices 220 with the fuel gas flow, the effect of this arrangement is small relative to the effect of fuel jet velocity. Specifically, the fuel jet velocity is significantly greater than the velocity of the combustion air streams.

In operation, fuel gas (at a pressure of about 20-30 psi in fuel gas tubes 210) is discharged at very high speed through fuel gas tube orifices 212. The resultant high velocity gas jets flow through relatively narrow burner slots 209 and into the combustion chamber. Combustion air from plenum 218 flows uniformly through baffle plate orifices 220, (generally parallel to the gas jets and toward baffle plate 205). Since the pressure in plenum 218 is substantially greater than the pressure in combustion chamber 202 the combustion air flows toward slots 209. Specifically, the combustion air flows over heat transfer fins 214 and the upper surface of burner plate 204, where it changes course by about 90 degrees and flows toward burner plate slots 209. As a result, burner plate 204 is cooled. The then heated combustion air changes direction by about 90 degrees as it is discharged with the fuel gas through burner plate slots 209.

Since the gas jets are focused so they do not impinge against burner plate 204 and the combustion air streams entering the burner chamber are generally parallel to and spaced from the gas jets, the fuel gas and combustion air are effectively kept separate until both are discharged into the combustion chamber. Accordingly, very high fuel gas pressures and, thus, fuel jet velocities can be used without developing a combustible fuel gas-air mixture in the burner. The high fuel gas velocities generate very high turbulence in combustion chamber 202 so that the desired high intensity flame is achieved. While conventional burners have a BTU output of between 50,000–500,000 BTU/CUFT/HR, the flame generated with a burner constructed in accordance with the principles of the present invention has a heat output of 1.5–2.5 million BTU/CUFT/HR. Typically, the flame temperature is, on average, in the vicinity of 1,200°–1,500° C. (according to the amount of excess combustion air: 30–80%. Refractory 230 can be provided along the interior walls of duct 201 to protect the burner assembly and surrounding elements from the heat generated by the high intensity flame.

Further, since combustion takes place in a relatively small volume with a high intensity flame, the size of the combustion chamber can be reduced. Accordingly, the space required for the burner assembly can be reduced.

Although some mixing of fuel gas and combustion air occurs along the boundary line between the cone-shaped gas jet and the combustion air, this mixing area is negligible. Further, when the air flows through the burner plate slots, it forms a layer between the fuel gas jets and the perimetrical surfaces (including the edges) of the slots and, thus, maintains the fuel gas spaced from those surfaces. Accordingly, the concentration of fuel gas in the boundary region of the slot edges is sufficiently low to preclude flame propagation from combustion chamber 202 along the plate surface. In the region of the mixing area, flame flashback is prevented by the flow velocity which is much greater than flame propagation velocity.

Further, the above-described uniform flow of combustion air substantially across the entire volume of burner chamber 208 provides a substantially constant air-to-fuel ratio throughout combustion chamber 202. The uniform air-to-fuel ratio further increases the intensity of the flame.

Another advantage of this construction is that with a sufficient amount of excess air (air in excess of that needed for complete combustion as described above) the burner assembly generates very low $NO_x$. This results from the low residence time of the nitrogen (from the combustion air) in the high intensity flame and the avoidance of hot spots within the flame due to the large degree of turbulence and the uniform air-to-fuel ratio throughout the combustion chamber volume. Specifically, the burner generates only about 0.015–0.005 lbs $NO_x$/million BTU.

Obviously, the sizes of the elements and materials used to construct a burner in accordance with the principles of the invention can be selected from a wide variety of sizes and/or materials. Merely to exemplify a preferred makeup of these components which has been found to produce the desired results, the following example may be recited. The burner plate and burner chamber sidewalls are heat-resistant steel or alloy casting. The fuel gas tubes and upper baffle plate are carbon steel. When natural gas is used as a fuel gas and the fuel gas pressure in fuel gas pipe 210 is 1–20 psig, the following combination of parameters exemplifies one combination that provides the desired results. Each discharge orifice in the fuel gas tube has a diameter of about 1/10 to 1/16 inch and is spaced about 1 inch from an adjacent discharge orifice. The burner plate slots have a width of about 0.8 inch and are spaced about 5 to 8 inches apart. Each set of fuel discharge orifices is spaced about 2.5 to 3 inches from the burner plate slot with which it cooperates. The radial distance between the inner and outer walls of the burner is about 400–600 mm. The air-to-fuel ratio in the burner is about 30–90% above the stoichiometric ratio.

The above is a detailed description of a particular embodiment of the invention. It is recognized that departures from the disclosed embodiment of the invention may be made within the scope of the invention and that obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A high intensity burner comprising:
   a downstream plate having a slot through the thickness thereof for introducing a combustion mixture into a combustion chamber;
   a tubular member positioned upstream from said downstream plate, said tubular member having a portion adapted to couple said member to a fuel gas source, said tubular member further including an opening that is aligned with said slot for directing fuel gas toward and through said slot in said lower plate;
   an upstream plate positioned upstream from said tubular member such that a space is formed between said upstream and downstream plates, said upstream plate having a hole through the thickness thereof for introducing air into said space, said hole in said upstream plate being oriented such that the air introduced into said space is directed toward a portion of said downstream plate spaced from said slot, whereby mixing of fuel gas and air is minimized in said space before the fuel gas and air are discharged through said slots and into a combustion chamber downstream from said burner; and
   said downstream plate having a surface that faces toward said upstream plate, said downstream plate further including a plurality of projections for increasing heat transfer from said downstream plate, said projections extending from said surface toward said upstream plate.

2. The burner of claim 1 further including an air plenum, said upstream plate being coupled to said air plenum.

3. A high intensity burner comprising:
   a lower plate having a plurality of slots through the thickness thereof for introducing a combustion mixture into a combustion chamber, the remaining portion of said plate being imperforate;
   a plurality of tubular members positioned above and spaced from said lower plate, each tubular member having a portion for coupling said member to a fuel gas source, each tubular member further having a plurality of openings that are aligned with one of said slots for directing fuel gas toward and through said slot in said lower plate; and
   an upper plate positioned above said tubular members such that a space is formed between said upper and lower plates, said upper plate having a plurality of holes through the thickness thereof for introducing air into said space, said holes in said upper plate being oriented such that air introduced through said holes is directed toward said imperforate portion of said lower plate and deflected toward said slots, whereby mixing of fuel gas and air is minimized before the fuel gas and air are discharged through said slots and into a combustion chamber downstream from said burner.

4. The burner of claim 4 wherein each slot and the gas tube openings aligned therewith define a plane, said upper plate holes being offset from each such plane.

5. The burner of claim 3 wherein each tubular member is substantially parallel to a respective slot.

6. The burner of claim 3 wherein said openings in each of said tubular members are spaced from one another and aligned in a row.

7. The burner of claim 6 wherein each row of openings is substantially parallel to a corresponding slot.

8. The burner of claim 6 wherein each tubular member is substantially parallel to a corresponding slot.

9. The burner of claim 3 further including an air plenum, said upper plate being coupled to said air plenum such that air from said plenum flows through said holes in said upper plate.

10. The burner of claim 9 wherein said air plenum includes a conduit extending toward said upper plate such that said conduit directs air toward aid upper plate, the transverse cross-sectional area of said conduit immediately adjacent to said upper plate being substantially greater than the sum of the cross-sectional areas of said holes in said upper plate.

11. The burner of claim 3 wherein the ratio between the distance from the burner plate slot and the gas tube openings aligned therewith and the width of the burner plate slot is about 1.5:1 to 4:1.

12. The burner of claim 11 wherein said ratio is about 3:1.

13. The burner of claim 3 wherein said lower plate is annular, said slots extend radially toward the perimeter of said lower plate, and each tubular member is substantially parallel to a respective slot.

14. The burner of claim 3 wherein adjacent slots in said lower plate are spaced from each other a distance of about 5 to 8 inches.

15. The burner of claim 3 wherein said lower plate has a surface that faces toward said upper plate, said lower plate further includes a plurality of projections for increasing heat transfer from sad lower plate, said projections extend from said upper surface toward said upper plate.

16. A high intensity burner system comprising:
    a duct having an open lower end portion and an upper end portion, said duct forming a combustion chamber in the vicinity of said upper portion of said duct;
    a lower plate positioned in the region of said upper end portion of said duct upstream from said combustion chamber, said lower plate having a plurality of slots through the thickness thereof for introducing a combustion mixture into a said combustion chamber;
    a plurality of tubular members positioned above and spaced from said lower plate, each tubular member having a portion for coupling said member to a fuel gas source, each tubular member further having a plurality of openings that are aligned with one of said slots for directing fuel gas in jets toward and through said slots in said lower plate; and
    an upper plate positioned above said tubular members such that a space is formed between said upper and lower plates, said upper plate having a plurality of holes through the thickness thereof for introducing air into said space, said holes in said upper plate being oriented such that air forced through said holes exits said holes in streams that are generally parallel to said fuel gas jets and directed toward said lower plate where air introduced into said space is deflected about 90 degrees toward said slots, whereby mixing of fuel gas and air is minimized before the fuel gas and air are discharged through said slots and the air forms a buffer between the fuel gas and the edges of said slots.

17. The system of claim 16 wherein said slots are spaced about 5 to 8 inches from each other.

18. The system of claim 16 wherein said upper plate openings are offset from each plane defined by a slot and the gas tube openings aligned therewith.

19. The system of claim 16 wherein said upper and lower plates are substantially parallel, and said holes in said upper plate being angularly offset relative to said slots in said lower plate.

20. The system of claim 16 further including an air plenum, said upper plate being coupled to said air plenum such that air from said plenum flows through said holes in said upper plate.

21. The system of claim 20 wherein said air plenum includes a conduit extending toward said upper plate such that said conduit directs air toward said upper plate, the transverse cross-sectional area of said conduit immediately adjacent to said upper plate being substantially greater than the sum of the cross-sectional areas of said holes in said upper plate.

22. The system of claim 16 wherein said lower plate has a surface that faces toward said upper plate, said lower plate further includes a plurality of projections for increasing heat transfer from said lower plate, said projections extend from said upper surface toward said upper plate.

23. The system of claim 16 wherein said duct is conical with an inner circumferential and outer circumferential wall, and said lower and upper plates are annular.

* * * * *